United States Patent

Gundlach et al.

Patent Number: 5,540,765
Date of Patent: Jul. 30, 1996

[54] THERMAL INK JET COMPOSITION

[75] Inventors: Kurt B. Gundlach, Pittsford; Richard L. Colt, Rochester, both of N.Y.

[73] Assignee: Xerox Corporation, Stamford, Conn.

[21] Appl. No.: 480,974

[22] Filed: Jun. 7, 1995

[51] Int. Cl.$^6$ ............................................. C09D 11/02
[52] U.S. Cl. .................. 106/20 R; 106/22 R; 106/22 H; 106/20 D
[58] Field of Search ................... 106/20 R, 22 R, 106/22 H, 20 D

[56] References Cited

U.S. PATENT DOCUMENTS

| | | | |
|---|---|---|---|
| 4,026,713 | 5/1977 | Sambucetti et al. | 106/20 B |
| 4,400,216 | 8/1983 | Arora | 106/20 R |
| 4,508,570 | 4/1985 | Fujii et al. | 106/22 H |
| 4,623,689 | 11/1986 | Shintani et al. | 524/457 |
| 4,627,876 | 12/1986 | Fries et al. | 106/27 R |
| 4,790,880 | 12/1988 | Miller | 106/22 H |
| 4,793,264 | 12/1988 | Lin et al. | 106/22 H |
| 4,914,562 | 4/1990 | Abe et al. | 346/140 R |
| 5,019,166 | 5/1991 | Schwarz | 106/22 R |
| 5,116,409 | 5/1992 | Moffat | 106/22 R |
| 5,118,350 | 6/1992 | Prasad | 106/22 R |
| 5,143,547 | 9/1992 | Kappele | 106/22 R |
| 5,145,518 | 9/1992 | Winnik et al. | 106/20 B |
| 5,145,519 | 9/1992 | Kappele | 106/22 R |
| 5,196,436 | 12/1992 | Matrick | 106/20 D |
| 5,254,159 | 10/1993 | Gundlach et al. | 106/22 H |
| 5,273,573 | 12/1993 | Kappele | 106/22 R |
| 5,281,261 | 1/1994 | Lin | 106/20 R |

Primary Examiner—Helene Klemanski
Attorney, Agent, or Firm—Oliff & Berridge

[57] ABSTRACT

A thermal ink jet printing composition contains a surfactant comprising an alkylsulfoxide having an alkyl group of 4 to 6 carbon atoms. Preferably, the composition contains a betaine zwitterionic base and dibutylsulfoxide.

22 Claims, No Drawings

5,540,765

THERMAL INK JET COMPOSITION

BACKGROUND OF THE INVENTION

The invention relates to a thermal ink jet composition, a printing process and a method of improving the fast dry characteristics of inks.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or to a specific location on a recording medium. In drop-on-demand systems, a droplet is expelled from an orifice directly to a position on a recording medium in accordance with digital data signals. A droplet is not formed or expelled unless it is to be placed on the recording medium.

Quality thermal ink jet printing can be achieved by utilizing an aqueous ink composition containing at least one dye or pigment, a wetting agent and water. U.S. Pat. No. 4,508,570 to Fujii et al., discloses an aqueous ink for ink jet printing, which comprises a water-soluble direct dye and/or acid dye, a polyhydric alcohol and/or an alkyl ether thereof, water, and at least one water-soluble non-ionic surface active agent selected from a specified polyoxyethylene alkyl amine, a specified polyoxyethylene alkyl phenyl ether and a specified polyoxyethylene alkyl ether. U.S. Pat. No. 4,623,689 to Shintani et al., discloses an ink jet ink containing aqueous colored polymers, which comprise a homopolymer of an ethylenically unsaturated sulfonic acid or its salt or a copolymer of an ethylenically unsaturated sulfonic acid or its salt with another ethylenically unsaturated monomer, wherein the homopolymer or copolymer is dyed with a basic dye and has a lowest film-forming temperature of not higher than 35° C. U.S. Pat. No. 4,627,876 to Fries et al., discloses a printing ink containing a pigment and an alkyd resin binder. The resin binder is modified with fatty acids. The alkyd resin is the reaction product of (a) a fatty acid, triglyceride of a fatty acid or a mixture of fatty acids, (b) a polyol, (c) an epoxy resin and (d) a dicarboxylic acid.

U.S. Pat. No. 4,026,713 to Sambucetti et al. relates to a magnetic ink containing non-ionic, cationic and/or anionic surfactants. The surfactants may include glycerol, a lower alkyl monoether of ethylene glycol and/or a polyethylene diol.

U.S. Pat. No. 4,914,562 to Abe et al. discloses an ink jet composition containing an ionic surface active agent or a non-ionic surface active agent. The ionic surface active agent can be a dioctyl sulfosuccinate sodium salt, sodium oleate or dodecylbenzenesulfonic acid. The non-ionic surface active agent may be diethylene glycol mono-n-butyl ether or triethylene glycol mono-n-butyl ether.

U.S. Pat. No. 5,019,166 to Schwarz relates to a thermal ink jet printing composition comprising a dye, a liquid medium and a surfactant selected from the group consisting of polyoxyalkylated ethers, anionic bitail fluorothio alkyls, alkyl aryl sulfonates, alkyl amine quaternary salts and mixtures thereof.

U.S. Pat. No. 5,116,409 to Moffatt discloses a process for reducing color bleed of inks employed in thermal ink jet printing. The process comprises printing two inks side by side, each ink having a composition comprising (a) a vehicle and (b) about 0.1 to 10 wt. % of at least one water-soluble anionic dye. The vehicle comprises at least one member selected from the group consisting of zwitterionic surfactants and non-ionic amphiphiles and water or water and an organic solvent. Moffatt discloses a composition that includes SURFYNOL S465, an acetylenic polyethylene oxide, and 1,5-pentanediol.

U.S. Patent No. 5,254,159 to Gundlach et al. discloses an ink composition that comprises water, an anionic dye and an amine compound. The ink composition provides waterfast images. The disclosure of this patent is incorporated in its entirety herein by reference.

Full color printing in a thermal ink jet printing process requires an ink with fast dry characteristics. Fast dry characteristics can be improved by the addition of a penetrant. The penetrant can be a quasisurfactant penetrant. For the purposes of this invention, the quasisurfactant penetrant has a hydrophilic head and a tail that is hydrophobic but too short to impart the properties of a strong surfactant like sodium lauryl sulfate while surfactants with long hydrophobic tails typically form micelles at low concentrations, the quasisurfactant penetrants do not form micelles. A preferred quasisurfactant penetrant is a surfactant that is substituted with a polar substituent toward one end of a chain of 4-8 aliphatic carbon atoms. Exemplary penetrants include dl-1, 2-hexanediol, 1,2-octanediol, butylcarbitol, 1-cyclohexyl-2-pyrrolidinone, 2-methyl-2 -propyl-1-3-propanediol and 1-butanesulfonic acid sodium salt.

A penetrant imparts quick-dry characteristics to a thermal ink jet ink composition. However, effectiveness of a penetrant in providing quick-dry characteristics varies with ink composition solvent. Some penetrants do not provide acceptable quick-dry characteristics to some ink-solvent systems. Cosolvents can be added to ink compositions to improve effectiveness of the surfactant penetrant or penetrant concentration in the ink compositions can be increased to achieve satisfactory quick-dry characteristics. However, some cosolvent packages and/or higher penetrant concentrations cause deterioration of thermal ink jet hardware. For example, higher loads of butylcarbitol or higher loads of cyclohexylpyrrolidinone aggressively attack cartridge materials and seals.

The incorporation of salts into inks containing organic non-ionic penetrants can aid in phase separation of an organic cosolvent through a "salting out" effect. Phase separation can reduce dry time of an ink on paper. This effect is observed for the incorporation of ionic salts such as sodium chloride. However, ionic salts destabilize ink compositions causing dye to precipitate.

The present invention relates to an improved thermal ink jet printing composition with reduced dry time. The composition is characterized by improved stability.

SUMMARY OF THE INVENTION

The present invention relates to an improved thermal ink jet printing composition containing a liquid vehicle, a colorant and a surfactant comprising an alkylsulfoxide having an alkyl group of 4 to 6 carbon atoms. Preferably, the alkylsulfoxide is dibutylsulfoxide.

The present invention also relates to a thermal ink jet printing process comprising causing an ink jet composition comprising a liquid vehicle, a colorant and a surfactant comprising an alkylsulfoxide having an alkyl group of 4 to 6 carbon atoms to be ejected in an imagewise fashion from a thermal ink jet printer onto a substrate.

Finally, the present invention is directed to a method of improving fast dry characteristics of ink jet inks comprising incorporating into a thermal ink jet composition a surfactant comprising an alkylsulfoxide having an alkyl group of 4 to 6 carbon atoms.

DETAILED DESCRIPTION OF PREFERRED EMBODIMENTS

Inks of the present invention comprise a dye colorant. Generally, any effective dye, such as one of the direct dyes or the acid dyes, may be selected, provided that the dye is compatible with the other ink components and is soluble in the liquid medium.

Examples of suitable dyes include Bernacid Red 2BMN; Pontamine Brilliant Bond Blue A; BASF X-34; Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GFT Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodagaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodagaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Severon Blue 5GMF (ICI); Basacid Blue 750 (BASF); and the like. Typical preferred dyes include Bernacid Red, available from Berncolors, Poughkeepsie, N.Y., Pontamine Brilliant Bond Blue, Berncolor A. Y. 34, Basacid Black X34, Carta Black 2 GT, Telon Fast Yellow 4GL-175, and the Like. The dye is generally present in the ink composition in an effective amount, generally from about 0.5 to about 8 percent by weight, and preferably from about 1 to about 6 percent by weight.

The inks of the present invention also include a liquid medium. Frequently, water comprises the major portion of the liquid medium and, while it may comprise 100 percent of the liquid medium, water is generally present in an amount of from about 7 to about 93 percent by weight of the ink, and preferably from about 55 to about 85 percent by weight of the ink. The liquid vehicle can comprise water and a cosolvent. Preferably, the cosolvent is dimethylsulfoxide or sulfolane. Inks of the present invention containing a liquid vehicle comprising water and dimethylsulfoxide or sulfolane and dibutylsulfoxide demonstrate rapid penetration properties appropriate for full color desktop printing. The inks provide excellent penetration properties with loads of dibutylsulfoxide in the range of about 5 weight percent.

Preferably, the inks of the present invention also contain a humectant such as a glycol, including ethylene glycol, propylene glycol, other glycols or other known humectants as part of the liquid medium. When present, the humectant is present in an effective amount, generally from about 5 to about 60 percent by weight, preferably from about 10 to about 20 percent by weight, and most preferably at about 17 percent by weight. Any other suitable liquid medium can also be employed provided that the objectives of the present invention are achieved.

Optionally, the ink composition can include a biocide such as sorbic acid, 1-(3-chloroallyl)-3,5,7-triaza-1-azoniaadamantane chloride, commercially available as Dowicil 200 (Dow Chemical Company, Midland, Mich.), vinylene-bis thiocyanate, commercially available as Dowicil 200 (Dow Chemical Company, Midland, Mich.), vinylene-bis thiocyanate, commercially available as Cytox 3711 (American Cyanamid Company, Wayne, N.J.), disodium ethylenebisdithiocarbamate, commercially available as Dithone D14 (Rohm & Haas Company, Philadelphia, Pa.), bis-(trichloromethyl) sulfone commercially available as Biocide N-1386 (Stauffer Chemical Company, Westport, Conn.), zinc pyridimethione, commercially available as zinc omadine (Olin Corporation Stamford, Conn.), 2-bromo-t-nitropropane-1,3-diol, commercially available as onyxide 500 (Onyx Chemical Company, Jersey City, N.J.), Bosquat MB50 (Louza, Inc., Fairtown, N.J.) and the like may be present in the inks of the present invention. When present the biocide is in an effective amount, generally from about 0.01 to about 1 percent by weight, and preferably from about 0.1 to about 0.5 percent by weight.

The surfactant of the present invention comprises an alkylsulfoxide having an alkyl group of 4 to 6 carbon atoms. A preferred alkylsulfoxide is dibutylsulfoxide. Alkylsulfoxide includes dialkylsulfoxides with at least one alkyl having 4 to 6 carbon atoms. Lange's Handbook of Chemistry, McGraw Hill, 13th Edition, indicates that dibutylsulfoxide is insoluble in water. Surprisingly and contrary to Lange, it has been found that the dibutylsulfoxide forms homogeneous solutions in water in loads of up to 15 weight percent. In formulations wherein a liquid vehicle comprises water and a dimethylsulfoxide or sulfolane cosolvent, the dibutylsulfoxide surfactant demonstrates rapid penetration properties that can be used for full color printing.

Additionally, the present invention relates to a surfactant comprising a betaine zwitterionic base and an alkylsulfoxide having an alkyl group of 4 to 6 carbon atoms. A betaine zwitterionic base is characterized by the $(CH_3)_3+NCH_2COO-$ moiety. Examples a betaine zwitterionic base are betaine and carnitine. The related sulfobetaines and other zwitterionic surfactants with hydrophobic tails ranging from decyl to hexadecyl are effective as penetrants by themselves. While betaine by itself has no surfactant properties, betaine is suitable in combination with the alkylsulfoxide of the invention. The betaine zwitterionic base activates the penetration activity of the alkylsulfoxide, particularly of dibutylsulfoxide, to permit even lower loadings of the alkylsulfoxide. Since higher penetrant concentrations can cause deterioration of thermal ink jet hardware, the effectiveness of low loadings of dibutylsulfoxide as a penetrant is particularly valuable. Inks formulated with low loads of dibutylsulfoxide unexpectedly display unusually high surface tensions sometimes in the range of 40 dyne/cm and excellent repellant activity on ink jet printer front faces.

The ink jet inks of the present invention can comprise up to 15 wt. % weight percent alkylsulfoxide. In compositions that are formulated with dimethylsulfoxide or sulfolane as cosolvents, the compositions can comprise 0.5 to 15 wt. % alkylsulfoxide, preferably 3 to 10 wt. % percent alkylsulfoxide and 4 to 6 wt. % as most preferred. The ink jet inks of the present invention comprising betaine and dibutylsulfoxide can comprise 10 to 25 wt. % betaine and 0.5 to 7 wt. % dibutylsulfoxide. Preferably, the compositions contain 15 to 20 wt. % betaine and 1 to 4 wt. % dibutylsulfoxide.

The improvement obtained by incorporation of a betaine zwitterionic base into inks containing the alkylsulfoxide may be due to a base separation of the organic cosolvent through a "salting out" effect when ink contacts substrate. The addition of the betaine zwitterionic base not only improves dry times but does not destabilize the ink composition to cause dye to precipitate. Inks containing the betaine and alkysulfoxide remain stable and homogeneous.

Additional advantages of the combination surfactant including betaine and an alkysulfoxide are improved solid area covering quality, elimination of decapped front face ink cartridge "weep" and improved print cartridge decapped print recoverability. Decapped face ink "weep" can occur when a print cartridge is left open and ink floods out of nozzles onto the cartridge front face plate. In one test for "weep," a cartridge is removed from a printer and the front face of the cartridge is cleaned with a vacuum wand. The cartridge is then permitted to set uncapped to evaporate ink from nozzle orifices. "Weep" occurs when the ink does not evaporate but rather oozes from nozzles and forms a crystalline ink deposit on the cartridge front face. "Decapped recoverability" describes the quality of print that can be provided after the cartridge is replaced into the printer. Immediate recoverability means that the cartridge immediately begins to print clearly in acceptable quality.

The ink compositions of the present invention have a viscosity suitable for use in thermal ink jet printing processes. Typically, the ink viscosity is no more than about 5 centipoise, and preferably is from about 1 to about 2.5 centipoise.

Ink composition of the present invention can be prepared by any suitable process. Typically, the inks are prepared by simple mixing of ingredients. One process entails mixing all of the ink ingredients together and filtering the mixture to obtain an ink. The inks of the present invention can be prepared by mixing ingredients, heating if desired, and filtering, followed by adding the surfactant of the present invention to the mixture and mixing at room temperature with moderate shaking until a homogeneous mixture is obtained, typically from about 5 to about 20 minutes. Alternatively, the surfactant of the present invention can be mixed with the other ink ingredients during the ink preparation process.

Ink pH is adjusted to a desired level at some time during the preparation process. Typically, pH adjustment occurs subsequent to most of the other ink preparation steps by addition of an acid and a buffer, and preferably the pH adjustments occurs prior to filtration so that any solid precipitates caused by pH adjustment can be removed from the ink during the filtration step.

The present invention is also directed to a process that comprises incorporating an ink composition of the present invention into an ink jet printing apparatus and causing droplets of the ink composition to be ejected in an imagewise pattern onto a substrate. In an embodiment of the invention, the printing apparatus employs a thermal ink jet process wherein the ink in nozzles is selectively heated thereby causing droplets of the ink to be ejected in an imagewise pattern.

The printing process of the invention can be employed on any suitable substrate, including plain papers such as Xerox® 4024 papers, ruled notebook paper, bond paper, silica coated papers such as Sharp Company silica coated paper, Jujo paper, and the like, transparency materials, fabrics, textile products, plastic, polymeric films and inorganic substrates such as metals and wood, and the like. In one embodiment, the process comprises printing onto a porous of ink absorbent substrate, such as plain paper.

The invention will further be illustrated in the following, non-limiting examples, it being understood that these examples are intended to be illustrative only and that the invention is not intended to be limited to the materials, conditions, process parameters and the like recited therein.

In the Tables of the Examples, RO Water is deionized water, GM is grams, RM is Roll Mill, DT is dry time and WWB is a wire wound bar drawdown test. The wire wound bar drawdown test is used to determine ink dry times. A bar with a wrapped wire saturated with ink composition is drawn down a paper to deposit ink. The time for the ink to dry is a measured.

EXAMPLE I

In a bottle are mixed 0.49 gram of dibutylsulfoxide, 1.01 gram of sulfolane (97%) and the bottle is placed on a roll mill for 2 minutes to provide a homogeneous mixture. Thereafter, 7.73 grams of distilled water are added to the bottle and the bottle is placed on the roll mill for an additional 10 minutes. Thereafter, 0.23 gram of Duasyn Acid Blue (Acid Blue 9) is added to the bottle and the bottle is again placed on the roll mill for 10 minutes.

Dry time of the resulting ink is determined by a wire wound bar drawdown test. A bar with a wrapped No. 8 wire saturated with ink composition is drawn down a paper to deposit ink. The wire wound drawdown test indicates a satisfactory dry time of 1 second.

The ink composition, method of preparing the composition and test results are summarized in Table I.

TABLE I

| INGREDIENT/DESCRIPTION | VENDOR | AMOUNT (GM) | SOL N % | MOLE EQV |
|---|---|---|---|---|
| DIBUTYLSULFOXIDE | ALDRICH | 0.49 | 5 | NA |
| SULFOLANE(97%), ROLL MILL 2 MINUTES, HOMOGENEOUS | PHILLIPS | 1.01 | 10 | |

TABLE I-continued

| INGREDIENT/DESCRIPTION | VENDOR | AMOUNT (GM) | SOL N % | MOLE EQV |
|---|---|---|---|---|
| RO WATER | 103 | 7.73 | 8.25 | 82.5 |
| RM 10 MIN, HOMOGENEOUS | NA | NA | NA | NA |
| DUASYN ACID BLUE AE-SF VP344 (ACID BLUE 9) | HOECHST | 0.23 | 2.2 | |
| ROLL MILL 10 MINUTES, HOMOGENEOUS NO FOAM | NA | NA | NA | NA |

WWB DRAWDOWN ON COURTLAND FELT PAPER DT = 1 SECOND

EXAMPLES II–VIII

Ink compositions are prepared according to the descriptions in the following Tables II–VIII. The compositions are tested for drying by the indicated wire wound drawdown test, for filtering (where indicated) and for penetration power (where indicated).

TABLE II

| INGREDIENT/DESCRIPTION | VENDOR | AMOUNT (GM) | SOL N % | MOLE EQV |
|---|---|---|---|---|
| DIBUTYLSULFOXIDE | ALDRICH | 0.5 | 5 | NA |
| DIMETHYLSULFOXIDE | ALDRICH | 0.99 | 10 | |
| RO WATER | 103 | 0.25 | 22.5 | NA |
| RM 10 MIN, HOMOGENEOUS | NA | NA | NA | NA |
| DUASYN ACID BLUE AE-SF VP344 (ACID BLUE 9) | HOESCHT | 0.22 | 2.2 | |
| ROLL MILL 10 MINUTES, HOMOGENEOUS NO FOAM | NA | NA | NA | NA |

WWB DRAWDOWN ON COURTLAND FELT PAPER DT = 0.3 SECONDS

TABLE III

| INGREDIENT/DESCRIPTION | VENDOR | AMOUNT (GM) | SOL N % | MOLE EQV |
|---|---|---|---|---|
| TRIMETHYLOLPROPANE | ALDRICH | 0.71 | 7 | |
| RO WATER, RM 5 MIN., HOMOGENEOUS | 103 | 7.86 | 75 | NA |
| BETAINE, RM 5 NUB, HOMOGENEOUS, DEAERATION NOTED | ALDRICH | 1 | 10 | |
| DIBUTYLSULFOXIDE, RM 5 MIN., HOMOGENEOUS | ALDRICH | 0.5 | 5 | NA |
| RO WATER | 103 | 0.51 | 81 TOTAL | NA |
| RM 10 MIN, HOMOGENEOUS | NA | NA | NA | NA |
| DUASYN ACID BLUE AE-SF VP344 (ACID BLUE 9) | HOESCHT | 0.21 | 2.2 | |
| ROLL MILL 10 MINUTES, HOMOGENEOUS NO FOAM | NA | NA | NA | NA |

WWB DRAWDOWN ON COURTLAND FELT PAPER DT = 0.2 SECONDS
SALTING THE VEHICLE REDUCED DRY TIME BUT DID NOT DESTABILIZE THE PENETRANT TO THE POINT OF PHASE SEPARATION

TABLE IV

| INGREDIENT/DESCRIPTION | VENDOR | AMOUNT (GM) | SOL N % | MOLE EQV |
|---|---|---|---|---|
| TRIMETHYLOLPROPANE | ALDRICH | 0.7 | 7 | |
| RO WATER, RM 5 MIN., HOMOGENEOUS | 103 | 7.84 | 76 | NA |
| BETAINE, RM 5 NUB, HOMOGENEOUS, DEAIRATION NOTED | ALDRICH | 1 | 10 | |
| DIBUTYLSULFOXIDE, RM 5 MIN., HOMOGENEOUS | ALDRICH | 0.4 | 4 | NA |
| RM 10 MIN, HOMOGENEOUS | NA | NA | NA | NA |
| DUASYN ACID BLUE AE-SF VP344 (ACID BLUE 9) | HOESCHT | 0.22 | 2.2 | |
| ROLL MILL 10 MINUTES, HOMOGENEOUS NO FOAM | NA | NA | NA | NA |

WWB DRAWDOWN ON COURTLAND FELT PAPER DT = 0.3 SECONDS

TABLE V

| INGREDIENT/DESCRIPTION | VENDOR | AMOUNT (GM) | SOL N % | MOLE EQV |
|---|---|---|---|---|
| TRIMETHYLOLPROPANE | ALDRICH | 0.7 | 7 | |
| RO WATER, RM 5 MIN., HOMOGENEOUS | 103 | 7.92 | 79 | NA |
| BETAINE, RM 5 NUB, HOMOGENEOUS, DEAIRATION NOTED | ALDRICH | 1 | 10 | |
| DIBUTYLSULFOXIDE, RM 5 MIN., HOMOGENEOUS | ALDRICH | 0.23 | 2.3 | NA |
| RM 10 MIN, HOMOGENEOUS | NA | NA | NA | NA |

TABLE V-continued

| INGREDIENT/DESCRIPTION | VENDOR | AMOUNT (GM) | SOL N % | MOLE EQV |
|---|---|---|---|---|
| DUASYN ACID BLUE AE-SF VP344 (ACID BLUE 9) | HOESCHT | 0.22 | 2.2 | |
| ROLL MILL 10 MINUTES, HOMOGENEOUS NO FOAM | NA | NA | NA | NA |

WWB DRAWDOWN ON COURTLAND FELT PAPER DT = 6 SECONDS

TABLE VI

| INGREDIENT/DESCRIPTION | VENDOR | AMOUMT (GM) | SOL N % | MOLE EQV |
|---|---|---|---|---|
| RO WATER | 103 | 7.44 | 75 | NA |
| BETAINE, RM 5 MIN., HOMOGENEOUS, DEAIRATION NOTED | ALDRICH | 2.01 | 20 | |
| DIBUTYLSULFOXIDE, RM 5 MIN., HOMOGENEOUS | ALDRICH | 0.15 | 1.5 | NA |
| RM 10 MIN, HOMOGENEOUS | NA | NA | NA | NA |
| DUASYN ACID BLUE AE-SF VP344 (ACID BLUE 9) | HOESCHT | 0.23 | 2.2 | |
| RM 10 MIN., DDDTCF = 40 SECONDS | NA | NA | NA | NA |
| BUTYLSULFOXIDE, RM 5 MIN., HOMOGENEOUS | ALDRICH | 0.05 | 2 TOTAL | NA |
| RM 10 MIN., DDDTCF = 15 SECONDS | NA | NA | NA | NA |
| BUTYLSULFOXIDE, RM 5 MIN., HOMOGENEOUS | ALDRICH | 0.04 | 2.4 TOTAL | NA |
| RM 10 MIN., DDDTCF = 2 SECONDS | NA | NA | NA | NA |
| BUTYLSULFOXIDE RM 5 MIN., HOMOGENEOUS | ALDRICH | 0.03 | 2.7 TOTAL | NA |
| RM 10 MIN., DDDKF = 1 SECOND, ST = 38.0 | NA | NA | NA | NA |

INCREASING THE BETAINE LOAD FROM 10 to 20 WT % INCREASED PENETRATION POWER OF DIBUTYLSULFOXIDE WITHOUT DESTABILIZING TO POINT OF PHASE SEPARATION

TABLE VII

| INGREDIENT/DESCRIPTION | VENDOR | AMOUNT (GM) | SOL N % |
|---|---|---|---|
| BOTTLE ONLY TARE | NALGENE | NA | NA |
| RO WATER | 103 | 92.33 | 26.165 |
| TRIS(HYDROXYMETHYL)AMINOMETHANE, BASE COMPONENT OF BUFFER | ALDRICH | 1 | 8.8 |
| ETHYLENEDIAMINE TETRAACETIC ACID, BUFFER ACID COMPONENT | ALDRICH | 0.1?? | 0.38 |
| RO WATER, MAJORITY | 103 | 29.7 | 14.89 |
| DOWICIL RIOCIDE | DOW CHEMICAL | 0.2007 | 8.10035 |
| TMP, HUMECTANT | ALDRICH | 14.8 | 7.66 |
| BETAINE HUMECTANT | ESPIRIT | — | 70 |
| DIBUTYLSULFOXIDE, PENETRANT | ALDRICH | 6.41 | 3.30 |
| PROJET CYAN DYE | ZEMEDA COLORS | — | — |
| RO WATER, 10 FINAL WEIGHT | 193 | 5.69 | 2.94 |
| ROLL MILL 30 MINUTE | NA | NA | NA |

FILTER PROCESSES: 0.2 MICRON GEIMAN NYLAFLOW FILTER DISC: 50 SECONDS

TABLE VIII

| INGREDIENT/DESCRIPTION | VENDOR | AMOUNT (GM) | SOL N % |
|---|---|---|---|
| BOTTLE ONLY TARE | NALGENE | NA | NA |
| RO WATER | 103 | — | 29.065 |
| TRIS(HYDROXYMETHYL)AMINOMETHANE, BASE COMPONENT OF BUFFER | ALDRICH | 1 | 0.8 |
| ETHYLENEDIAMINETETRAACETIC ACID, BUFFER ACID COMPONENT | ALDRICH | 0.7 | 0.38 |
| RO WATER, MAJORITY | 103 | 49.22 | 24.61 |
| DOWICIL, BIOCIDE | DOW CHEMICAL | 0.2008 | 0.1004 |
| BETAINE, HUMECRANT | ESPIRIT | 40 | 20 |
| DIBUTYLSULFOXIDE, PENETRANT | ALDRICH | 6.91 | 3.008 |
| DIRECT RED 227 NA LIQUID, DYE | TRIOON COLORS | 33.8 | 4.15 |
| BASACID BLACK, NO. 34, DYE | BASF | 9.74 | 16.75 |
| RO WATER, TO FINAL WEIGHT | 103 | NA | 4.07 |
| ROLL MILL 30 MINUTES, MIX | NA | NA | NA |

FILTER PROCESSES: 0.2 MICRON GEIMAN NYLAFLOW FILTER DISC: 50 SECONDS

The Tables show that dibutylsulfoxide is soluble in water and provides an improved ink composition.

While the invention has been described with reference to the particular preferred embodiments, the invention is not limited to the specific examples given, and other examples and modifications can be made by those skilled in the art without departing from the spirit and scope of the invention and claims.

What is claimed is:

1. An ink jet printing composition containing (A) a liquid vehicle comprising water and a cosolvent selected from the group consisting of dimethylsulfoxide and sulfolane, (B) a colorant and (C) a surfactant comprising an alkylsulfoxide having an alkyl group of 4 to 6 carbon atoms.

2. The ink jet printing composition of claim 1, wherein said alkylsulfoxide is dibutylsulfoxide.

3. An ink jet composition containing (A) a liquid vehicle, (B) a colorant and (C) a surfactant, wherein said surfactant comprises a betaine zwitterionic base and an alkylsulfoxide having an alkyl group of 4 to 6 carbon atoms.

4. The ink jet printing composition of claim 3, wherein said betaine zwitterionic base is characterized by a $(CH_3)_3+NCH_2COO^-$ moiety.

5. The ink jet printing composition of claim 1, comprising 0.5 to 15 wt. % alkylsulfoxide.

6. The ink jet printing composition of claim 1, comprising 3 to 10 wt. % alkylsulfoxide.

7. The ink jet printing composition of claim 1, comprising 4 to 6 wt. % alkylsulfoxide.

8. The ink jet printing composition of claim 4, comprising 10 to 25 wt. % betaine and 0.5 to 7 wt. % dibutylsulfoxide.

9. The ink jet printing composition of claim 4, comprising 15 to 20 wt. % betaine and 1 to 4 wt. % dibutylsulfoxide.

10. An ink jet printing process comprising causing an ink jet composition containing (A) a liquid vehicle comprising water and a cosolvent selected from the group consisting of dimethylsulfoxide and sulfolane, (B) a colorant and (C) a surfactant comprising an alkylsulfoxide having an alkyl group of 4 to 6 carbon atoms to be ejected in an imagewise fashion from a thermal ink jet printer onto a substrate.

11. The ink jet printing process of claim 10, wherein said alkylsulfoxide is dibutylsulfoxide.

12. An ink jet printing process comprising causing an ink jet composition containing (A) a liquid vehicle, (B) a colorant and (C) a surfactant, to be ejected in an imagewise fashion from a thermal ink jet printer onto a substrate, wherein said surfactant comprises a betaine zwotterionic base and an alkylsulfoxide having an alkyl group of 4 to 6 carbon atoms.

13. The ink jet printing process of claim 12, wherein said betaine zwitterionic base is characterized by a $(CH_3)_3+NCH_2COO^-$ moiety.

14. A method of improving the fast dry characteristics of ink jet inks, comprising incorporating into an ink jet composition containing a liquid vehicle comprising water and a cosolvent selected from the group consisting of dimethylsulfoxide and sulfolane, a surfactant comprising an alkylsulfoxide having an alkyl group of 4 to 6 carbon atoms.

15. The method of claim 14, wherein said alkylsulfoxide is dibutylsulfoxide.

16. A method of improving the fast dry characteristics of ink jet inks, comprising incorporating into in an ink jet composition, a surfactant comprising a betaine zwitterionic base and an alkylsulfoxide having an alkyl group of 4 to 6 carbon atoms.

17. The method of claim 16, wherein said betaine zwitterionic base is characterized by a $(CH_3)_3+NCH_2COO^-$ moiety.

18. The method of claim 14, comprising 0.5 to 15 wt. % alkylsulfoxide.

19. The method of claim 14, comprising 3 to 10 wt. % alkylsulfoxide.

20. The method of claim 17, comprising 4 to 6 wt. % alkylsulfoxide.

21. The method of claim 17, comprising 10 to 25 wt. % betaine and 0.5 to 7 wt. % dibutylsulfoxide.

22. The method of claim 17, comprising 15 to 20 wt. % betaine and 1 to 4 wt. % dibutylsulfoxide.

* * * * *